United States Patent [19]

Ishida et al.

[11] 4,239,716
[45] Dec. 16, 1980

[54] GYPSUM MOLDINGS AS BUILDING MATERIALS AND METHODS MANUFACTURING THE SAID GYPSUM MOLDINGS

[75] Inventors: Nobumasa Ishida; Yasuo Yamada, both of Nagoya; Hideki Jinno, Aichi, all of Japan

[73] Assignee: Nippon Hardboard Co. Ltd., Nagoya, Japan

[21] Appl. No.: 909,938

[22] Filed: May 26, 1978

[30] Foreign Application Priority Data

| May 30, 1977 | [JP] | Japan | 52-63756 |
| Aug. 13, 1977 | [JP] | Japan | 52-97119 |
| Aug. 19, 1977 | [JP] | Japan | 52-99982 |
| Oct. 20, 1977 | [JP] | Japan | 52-125954 |
| Oct. 20, 1977 | [JP] | Japan | 52-125955 |

[51] Int. Cl.$^3$ .................................... B28B 1/26
[52] U.S. Cl. ............................. 264/86; 106/110; 106/111; 264/109; 264/333
[58] Field of Search .............. 264/86, 333, 109; 106/110, 111

[56] References Cited

U.S. PATENT DOCUMENTS

| 4,029,512 | 6/1977 | Jaunarajs | 106/110 |
| 4,038,094 | 7/1977 | Bondi | 106/110 |
| 4,085,001 | 4/1978 | Fukuwatari | 264/333 |

FOREIGN PATENT DOCUMENTS

| 52-17846 | 5/1977 | Japan | 264/333 |
| 1077665 | 8/1967 | United Kingdom | 264/333 |

Primary Examiner—John A. Parrish
Attorney, Agent, or Firm—Cooper, Dunham, Clark, Griffin & Moran

[57] ABSTRACT

A gypsum moldings as building materials having high strength is obtained by use of fibrous α-calcium sulfate hemihydrate as a raw material.

There are two methods manufacturing the said gypsum moldings. One of them is the wet method and the other is the dry method.

The wet method essentially consists of mixing fibrous α-calcium sulfate hemihydrate suspension with reinforcers et al., papering and dehydrating the resulting mixed suspension, with or without pressing the resulting wet mat, curing and drying the mat to obtain a gypsum moldings as building materials having high strength.

The dry method is roughly divided into two methods. One of them comprises adding water to fibrous α-calcium sulfate hemihydrate and molding the resulting wet hemihydrate, and the other comprises molding fibrous α-calcium sulfate hemihydrate and adding water to the resulting moldings.

6 Claims, 4 Drawing Figures

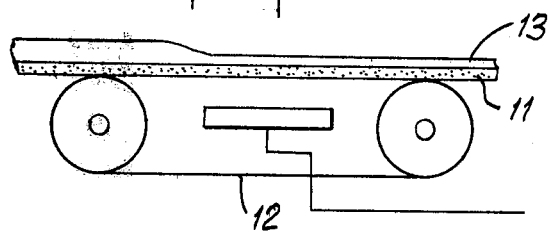
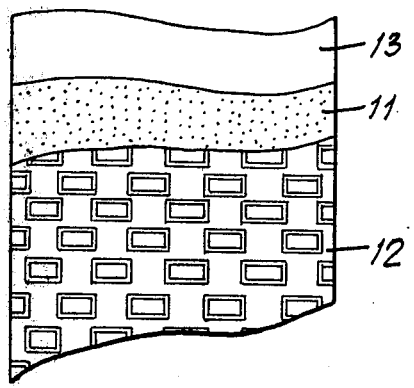
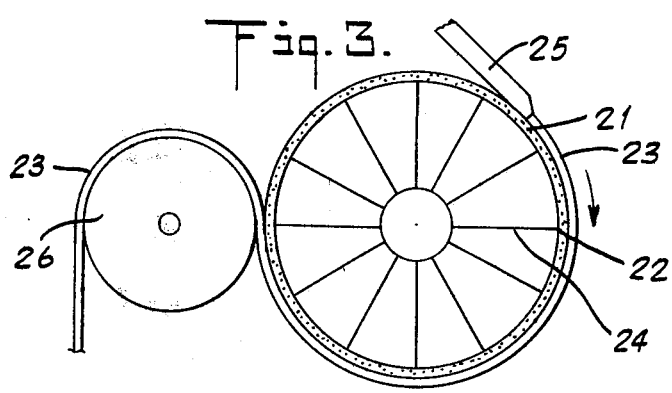
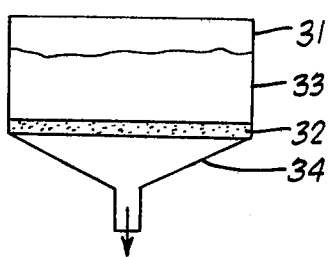

GYPSUM MOLDINGS AS BUILDING MATERIALS AND METHODS MANUFACTURING THE SAID GYPSUM MOLDINGS

BACKGROUND OF THE INVENTION

1. Field of the Invention

The invention relates to a gypsum moldings as building materials and methods manufacturing the said gypsum moldings by use of fibrous-$\alpha$-calcium sulfate hemihydrate as a raw material.

More particularly, the invention relates to a gypsum moldings as building materials having desired specific gravity and desired bending strength.

Farthermore, the invention relates to methods manufacturing the said gypsum moldings.

The said moldings of the invention is very useful as building materials because of its noncombustibility and high strength.

2. Description of the Prior Arts

The gypsum moldings essentially consists of calcium sulfate dihydrate, and hitherto has been manufactured by either of the following two methods.

One of them essentially consists of firing fibrous $\alpha$-calcium sulfate hemihydrate as a raw material, molding the resulting fibrous calcium sulfate anhydride, curing and drying the resulting moldings.

The other essentially consists of mixing powdered $\beta$-calcium sulfate hemihydrate as a raw material with a suitable amount of water, papering and dehydrating the resulting paste, molding the resulting wet mat, and then curing and drying the resulting moldings to convert $\beta$-calcium sulfate hemihydrate into dihydrate.

The former essentially includes the process converting fibrous $\alpha$-calcium sulfate hemihydrate into fibrous anhydride, so enormous energy is necessary to the dehydration process.

The latter has a fault of giving only moldings of limited specific gravity, because in this method it is necessary to limit the amount of water with which $\beta$-calcium sulfate hemihydrate is mixed.

SUMMARY OF THE INVENTION

Accordingly, an object of the present invention is to provide a low-priced gypsum moldings as building materials. Farther object of the present invention is to provide a gypsum moldings having desired specific gravity (0.2~1.9) and desired bending strength (7~330Kg/cm$^2$) by conquering the faults of the prior arts.

Yet farther object of the present invention is to provide efficient methods manufacturing the said gypsum moldings.

Briefly, these objects of the present invention can be attained by use of fibrous $\alpha$-calcium sulfate hemihydrate as a raw material, which is obtained by heat-treating of either calcium sulfate dihydrate in water or calcium sulfite in acidic solvent, since the methods manufacturing gypsum moldings by use of fibrous $\alpha$-calcium sulfate hemihydrate as a raw material is very economical of saving energy.

The said fibrous $\alpha$-calcium sulfate hemihydrate is converted into a gypsum moldings having high strength by any of the following three methods; the wet method which comprises mixing fibrous $\alpha$-calcium sulfate hemihydrate suspension with reinforcers et al., papering and dehydrating the resulting mixed suspension, with or without pressing the resulting wet mat, curing and drying the mat; the dry method (a) which comprises adding water to fibrous $\alpha$-calcium sulfate hemihydrate, mixing the resulting wet hemihydrate with reinforcers et al., pressure-molding the resulting mixture and then curing and drying the resulting moldings; the dry method (b) which comprises mixing fibrous $\alpha$-calcium sulfate hemihydrate with reinforcers et al., molding the resulting mixture, adding water to the resulting moldings, pressing the wet moldings, and then curing and drying the resulting pressed moldings.

BRIEF DESCRIPTION OF THE DRAWINGS

FIG. 1 is a side elevational view of a suction box attached with a porous caterpillar used in the process of the present invention;

FIG. 2 is a partial plan, broken-away view of the above said suction box;

FIG. 3 is a side or longitudinal section of a vacuum filter attached with a roll-typed papering machine employed in the process of the present invention; and FIG. 4 is a side elevational view of a suction box attached with a Chappmann-typed papering machine employed in the process of the present invention.

DETAILED DESCRIPTION OF THE PREFERRED EMBODIMENTS

The present invention relates to a gypsum moldings as building materials and methods manufacturing the said gypsum moldings by use of fibrous $\alpha$-calcium sulfate hemihydrate as a raw material.

The said gypsum moldings is obtained by any of the following three methods; the wet method which comprises mixing fibrous $\alpha$-calcium sulfate hemihydrate suspension with reinforcers et al., papering and dehydrating the resulting mixed suspension, with or without pressing the resulting wet mat, curing and drying the mat; the dry method (a) which comprises adding water to fibrous $\alpha$-calcium sulfate hemihydrate, mixing the resulting wet hemihydrate with reinforcers et al., pressure-molding the resulting mixture, and then curing and drying the resulting moldings; the dry method (b) which comprises mixing fibrous $\alpha$-calcium sulfate hemihydrate with reinforcers et al., molding to resulting mixture, adding water to the resulting moldings, pressing the resulting wet moldings, and then curing and drying the resulting pressed moldings.

The present invention will be explained in detail, as follows.

Fibrous $\alpha$-calcium sulfate hemihydrate as a raw material is usually obtained as a suspension by any of well known methods, for example, heat-treating of calcium sulfate dihydrate in water or the mixture between water and water-soluble organic solvents such as alcohols, ketones and the like; and heat-treating of calcium sulfite in acidic solvent.

In order to obtain the said gypsum moldings from the said fibrous $\alpha$-calcium sulfate hemihydrate, three methods are brought into practice, i.e., one wet method and two dry methods.

First of all, the wet method will be explained, as follows. The wet method essentially consists of mixing the said fibrous $\alpha$-calcium sulfate hemihydrate suspension with reinforcers et al., papering and dehydrating the resulting mixed suspension, with or without pressing the resulting wet mat, curing and drying the mat; and will be explained in detail as to the sequence of the following unit processes.

In this method, as a raw material, the said fibrous α-calcium sulfate hemihydrate suspension is used as it stands.

Suitable reinforcers which are added and mixed with the said suspension include natural fibers, such as wood pulp beated repeatedly and the like; synthetic fibers, such as polypropylene fibers, polyethylene fibers, polyamide fibers, arcylic fibers and the like; inorganic fibers such as glass fibers, ceramic fibers and the like; other fibrous materials; binding agents, e.g., synthetic resin, such as vinyl acetate resin, acrylic resin, urethane resin, epoxy resin and the like; and other self-adhesive materials. The said fibrous materials entangle mutually in the inner structure of the gypsum moldings and increase the structural strength thereof. The said binding agents, e.g., synthetic resin, and other self-adhesive materials reinforce the entanglement of the said fibrous materials and increase the structural strength of the gypsum moldings more and more thereof.

In addition to the above mentioned components, other materials can be added to the suspension. Such other materials include, for example, water repellent agents, such as metallic soaps, paraffin, silicone, polyvinyl tetrafluoride and the like; bulking agents, such as bentonite, talc, wood flour and the like; pigments, dyes and the like.

Other materials too numerous to mention are also suitable. For example, sulfuric acid, magnesium sulfate, sodium chloride, aluminium sulfate and the like are preferred as accelerators of hydrating fibrous α-calcium sulfate hemihydrate; ethyl alcohol, borax, sodium citrate, urea and the like as retarders.

The solids concentration of the mixed suspension is regulated below 20%, preferably, between 4 and 8% by weight.

The mixed suspension, regulated as above, is papered and dehydrated by any of papering machines, such as a longnet-type, a roll-type and the like. The said papering and dehydrating processes are preferred within 10 to 120 minutes after regulation of the mixed suspension, since fibrous α-calcium sulfate hemihydrate tends to hydrate into dihydrate in the suspension.

As to long-net-typed papering machine, metallic band, plastic band, porous felt band, felt-plastic laminating band and the like may be used as a carrier band.

As to round-typed papering machine, one-cylinder-typed, double-cylinder-typed and other multicylinder-typed papering machines may be used.

And as to other papering machines, a Chappmann-typed papering machine, i.e., a box having a porous bottom, may be used, too.

As to long-net-typed papering machine, in the practice of the present invention, dehydration of the resulting wet mat is accelerated by use of a suction box attached on the underside of a porous caterpillar.

And, as to round-typed papering machine, dehydration of the resulting wet mat is accelerated by use of evacuating cylinder(s) or by pressing out the said wet mat.

Some examples of the said papering machines are shown in FIGS. 1, 2, 3 and 4.

With reference to FIGS. 1 and 2, which are both side elevational views of the suction box attached with the porous caterpillar of the long-net-typed papering machine, the suction box with caterpillar 12 in contact with and supporting porous carrier band 11 is useful wherein caterpillar 12 is operated in synchronism with the movement of carrier band 11.

With reference to FIG. 3, which is a side or longitudinal section of a vacuum filter attached with a roll-typed papering machine, the mixed suspension may be cast through feeder 25 onto porous carrier 11 which is fitted around vacuum filter 24 and wherein take-up roll 26 is shown in combination with filter 24 to receive and remove formed wet mat 23.

With reference to FIG. 4, which is a side elevational view of a Chappmann-typed papering machine attached on a suction box, the mixed suspension may be cast into the box 31 having the porous bottom 32 attached on a suction box 34 and wherein a wet mat 33 is formed.

The thickness of the resulting wet mat is regulated. If desired, a number of wet mats are laminated before the regulation of the thickness.

As mentioned above, the wet mat, of which dehydration ratio is about 20 to 70% at dryness, is obtained.

It is to be understood that the invention is not limited to the precise embodiment described above and that minor modification may be made within the scope of the invention.

Then, the said wet mat is preferably pressed to obtain high specific gravity and high structural strength of gypsum moldings. In the practice of the present invention, the wet mat is cold-pressed above 50 Kg/cm$^2$, preferably at pressures of 100 to 500 Kg/cm$^2$, by roll pressing or the like.

The said wet mat is cured after pressing. In the practice of the present invention, the said wet mat is cured below 80° C. for more than 30 minutes, preferably at low temperatures below 30° C. for more than 1 hour. While the said wet mat is cured, a large amount of fibrous α-calcium sulfate hemihydrate converts into dihydrate in the wet mat, so self-hardinging and self adhesive properties, characteristic of calcium sulfate, make their appearance and the structural strength of the said wet mat increases.

After more than 80% of hemihydrate is converted into dihydrate, the resulting cured mat is dried in an oven at temperatures of 80° to 150° C. for more than 1 hour, and as mentioned above, gypsum moldings having high strength and small specific gravity suitable for building materials are obtained.

The dry method will be explained as follows. As mentioned above, the dry method is divided into two methods. One of them, the dry method (a) comprises adding water to fibrous α-calcium sulfate hemihydrate and molding the resulting wet hemihydrate, and the other, the dry method (b) comprises molding fibrous α-calcium sulfate hemihydrate and adding water to the resulting moldings.

First the dry method (a) will be explained as follows. The dry method (a) comprises adding water to fibrous α-calcium sulfate hemihydrate, mixing the resulting wet hemihydrate with reinforcers et al., pressure-molding the resulting mixture, and then curing and drying the resulting moldings; and will be explained in detail as to the sequence of the following unit processes.

As the first step, fibrous α-calcium sulfate hemihydrate as a raw material is obtained by filtering the said fibrous α-calcium sulfate hemihydrate suspension, then dehydrating and drying the resulting fibrous hemihydrate. In the practice of the present invention, after the said fibrous hemihydrate suspension is filtered, the resulting fibrous hemihydrate is soon heated within the temperature range between 90° and 180° C. to dry. Preferably, the fibrous hemihydrate should be heated above 97° C., since the α-calcium sulfate hemihydrate tends to hydrate into dihydrate below the said temperature.

At the second step, water is added to the said fibrous hemihydrate by spraying or the like. The ratio of the said water, which is added to the fibrous hemihydrate, is limited to that of 2 to 40%. The reason of the limitation is that if the ratio of the added water is less than 2%, it takes a great difficulty to mold the wet hemihydrate; and that if the ratio is more than 40%, it takes a great difficulty to dehydrate the resulting suspension because of a large excess of water, and moldability of the resulting wet hemihydrate becomes low, because fibrous α-calcium sulfate hemihydrate is converted into dihydrate before molded. And preferably, the said water is adsorbed or adhered as hemogeneously as possible to the said fibrous hemihydrate, in order to make it very easy to mold the resulting wet hemihydrate.

At the third step, reinforcers et al. are mixed with the resulting wet hemihydrate. The said reinforcers et al. are the like of those used in the wet method, and the actions of those materials are the like, too.

At the fourth step, the resulting mixture is pessure-molded. In the practice of the present invention, the said mixture is preformed, before pressure-molded, by pressing the mixture into a mold or by roll-pressing the mixture or the like. Then, the mixture is pressure-molded above 50 Kg/cm², mostly at pressures of 150 to 300 Kg/cm², for about 1 minute. Various kinds of moldings, such as plate-like body, deep-drawn body and the like, can be obtained by the said pressure molding. At the same time, pressure-molding of the mixture increases the density and the structural strength of the moldings.

At the fifth step, the resulting moldings is cured. In the practice of the present invention, in case that the water content of the moldings is 2 to 15%, the moldings is cured by standing in a wet atmosphere or by dipping it in water or the like. On the other hand, in case that the water content of the moldings is 15 to 40%, the moldings is cured, preferably below 50° C. for more than 30 minutes, without adding further water. While the moldings is cured, all of fibrous α-calcium sulfate hemihydrate is converted into dihydrate in the moldings, so a self-hardening property, makes its appearance and a high strength of gypsum moldings can be obtained.

Finally, the resulting cured moldings is dried. In the practice of the present invention, the said moldings is dried below 100° C. for 0.5 to 5 hours.

The dry method (b) will be explained as follows. The dry method (b) comprises mixing fibrous α-calcium sulfate hemihydrate with reinforcers et al., molding the resulting mixture, adding water to the resulting moldings, pressing the resulting wet moldings, and then curing and drying the resulting pressed moldings; and will be explained in detail as to the sequence of the following unit processes.

A raw material, fibrous α-calcium sulfate hemihydrate is the same with that used in the dry method (a).

At the first step, fibrous α-calcium sulfate hemihydrate is mixed with reinforcers et al.. The said reinforcers et al. are the like of those used in the wet method, and the actions of those materials are the like, too.

At the second step, the resulting mixture is molded. In the practice of the present invention, the said mixture is cast onto the caterpillar and formed into a mat having a preferable thickness, and then the mat surface is made uniform and flat by scratching it by means of a picker-roll, and finally the mat is slightly pressed. As mentioned above, the mixture is molded.

At the third step, water is added to the resulting moldings by use of sprayer or the like. As for water which is added to the said moldings, at least 18% of water to the fibrous α-calcium sulfate hemihydrate in the moldings is necessary to convert all the hemihydrate into dihydrate.

At the fourth step, the resulting wet moldings is pressed. In the practice of the present invention, the said moldings is pressed at pressures of 10 to 50 Kg/cm² by means of roll-press or panel-typed press. By way of the said pressing process, the added water is adsorbed into the moldings homogeneously to convert a large amount of fibrous α-calcium sulfate hemihydrate forming the moldings into dihydrate, and the thickness of the moldings is regulated.

At the fifth step, the resulting pressed moldings is cured. In the practice of the present invention, the said moldings is cured at comparatively low temperatures for more than 30 minutes, preferably for more than 1 hour.

Finally, the resulting cured moldings is dried below 120° C.

EXAMPLE 1

Calcium sulfite aqeous solution formed in a desulfurizer in the method manufacturing gypsum moldings from lime, is regulated to the calcium sulfite concentration 10%, and to PH 4.

The resulting regulated solution is charged into an autoclave, and wherein stirred for 80 minutes at 125° C. and 1.4 Kg/cm² (gauge-pressure) blowing air into the said solution.

As mentioned above, fibrous α-calcium sulfate hemihydrate as a raw material, having 30 to 150μ of length and 1 to 3μ of radius, is obtained as a suspension.

The resulting fibrous α-calcium sulfate hemihydrate suspension is mixed with wood pulp, 10 parts by wt. and paraffin emulsion 1 part by wt.

The resulting mixed suspension is cast into a box having a felt bottom attached on a suction box, and wherein papered and dehydrated.

The resulting wet mat is pressure-molded at 50, 100, 150, 250 and 500 Kg/cm² in the mold having a check bottom.

The resulting moldings is cured in contact with the atmosphere for 3 hrs., and dried at 90° C. for 1 hour.

The specific gravity and the bending strength of the moldings so obtained are shown against molding pressure in Table I.

TABLE I

| Molding Pressure Kg/cm² | Specific Gravity | Bending Strength Kg/cm² |
|---|---|---|
| 50 | 1.4 | 175 |
| 100 | 1.5 | 195 |
| 150 | 1.6 | 220 |
| 250 | 1.7 | 250 |
| 500 | 1.9 | 320 |

As indicated in Table I, by changing the molding-pressure of the wet mat variously, a gypsum moldings as building materials having desired specific gravity (1.4 to 1.9) and desired bending strength (175 to 320 Kg/cm²), is obtained.

EXAMPLE 2

Calcium sulfate dihydrate suspension, regulated to the dihydrate concentration 10%, is charged into an autoclave, and wherein stirred for 30 minutes at 125° C. and 1.4 Kg/cm² (gauge-pressure).

As above, fibrous α-calcium sulfate hemihydrate as a raw material, having 150 to 450μ of length and 1 to 5μ of radius, is obtained as a suspension.

The resulting fibrous α-calcium sulfate hemihydrate suspension is blown into a vessel at ordinary temperature and ordinary pressure, and then regulated to a mixed suspension of the following composition within 15 minutes.

| Constituents | Ratio |
| --- | --- |
| Fibrous α-hemihydrate[a] | 91 parts by wt. |
| Wood pulp | 4 parts by wt. |
| Paraffin emulsion | 3 parts by wt. |
| Sodium citrate[b] | 1 parts by wt. |
| Water | 1900 parts by wt. |

[a]Fibrous α-hemihydrate denotes fibrous α-calcium sulfate hemihydrate.
[b]Sodium citrate is used as a retarder of hydration.

Furthermore, the said mixed suspension is mixed with 1% aluminum sulfate.

Then the resulting mixed suspension is soon cast onto a metal-net attached on a suction box, and wherein papered and dehydrated.

The resulting wet mat is pressed by a panel-typed press to be regulated into a mat of desired specific gravity. The said regulation of specific gravity is carried out by use of the stopper of the panel-typed press.

The resulting pressed wet mat is then cured at ordinary temperature and ordinary pressure, and dried at 105° C.

The specific gravity and the bending strength of the moldings so obtained are shown in Table II.

TABLE II

| Specific Gravity | Bending Strength Kg/cm² |
| --- | --- |
| 0.2 | 7 |
| 0.3 | 11 |
| 0.4 | 16 |
| 0.5 | 24 |
| 0.7 | 52 |
| 0.8 | 67 |
| 1.0 | 98 |
| 1.2 | 133 |
| 1.5 | 175 |

As shown in Table II, by changing the molding pressure of the wet mat variously, a gypsum moldings as building materials, having desired specific gravity (0.2 to 1.5) and desired bending strength (7 to 175 Kg/cm²), is obtained.

EXAMPLE 3

Fibrous α-calcium sulfate hemihydrate suspension as a raw material is obtained by the same manner with that of Example 1.

The said suspension is filtered and dehydrated keeping the temperature of the said suspension above 100° C., then dried at 120° C. for 10 minutes to obtain fibrous α-calcium sulfate hemihydrate.

Water, 20 parts by wt. is sprayed and adsorbed homogeneously to the said fibrous hemihydrate.

Then, wood pulp, 10 parts by wt. is mixed.

The resulting mixture is preformed in a mold, then pressure-molded at 100, 200 or 300 Kg/cm².

The resulting moldings is cured at ordinary temperature for 3 hrs., and dried at 80° C. for 2 hrs.

The mechanical properties of the moldings so obtained is shown in Table III.

TABLE III

| Molding Pressure Kg/cm² | Specific Gravity | Bending Strength Kg/cm² |
| --- | --- | --- |
| 100 | 1.65 | 210 |
| 200 | 1.87 | 275 |
| 300 | 1.93 | 330 |

As indicated in Table III, by changing the molding-pressure of the wet mat, a gypsum moldings as building materials, having desired specific gravity (1.65 to 1.93) and desired bending strength (210 to 330 Kg/cm²), is obtained.

EXAMPLE 4

Fibrous α-calcium sulfate hemihydrate as a raw material is obtained by the same manner with that of Example 1.

By use of the said fibrous α-calcium sulfate hemihydrate, a mixture of the following composition.

| Constituents | Ratio |
| --- | --- |
| Fibrous α-hemihydrate[a] | 90 parts by wt. |
| Glass fiber | 6 parts by wt. |
| Polyvinyl acetate | 3 parts by wt. |
| Paraffin wax | 1 parts by wt. |

[a]Fibrous α-hemihydrate denotes fibrous α-calcium sulfate hemihydrate.

The said mixture is cast onto an endless porous band, and its surface is made uniform by means of a picker-roll.

Then, the said mixture is preformed by a roll-press to be a mat.

Water, 35 parts by wt. is sprayed onto the said mat.

The resulting wet mat is pressure-molded by means of a panel-typed press at pressures of 10 to 50 Kg/cm².

The resulting moldings is cured at 20° C. for 60 minutes.

Finally, the resulting cured moldings is dried at 105° C. for 90 minutes.

The mechanical properties of the moldings so obtained are shown against molding pressure in Table IV.

TABLE IV

| Molding Pressure Kg/cm² | Specific Gravity | Bending Strength Kg/cm² |
| --- | --- | --- |
| 10 | 0.5 | 36 |
| 25 | 0.8 | 63 |
| 40 | 1.0 | 89 |
| 50 | 1.2 | 112 |

As shown in Table IV, by changing the molding-pressure of the wet mat variously, a gypsum moldings as building materials, having desired specific gravity (0.5 to 1.2) and desired bending strength (36 to 112 Kg/cm²), is obtained.

We claim:

1. A method of manufacturing gypsum moldings useful as building materials which comprises molding an admixture of fibrous α-calcium sulfate hemihydrate with reinforcing agents in the presence of water, heat curing the resulting moldings and drying the resulting heat-cured moldings.

2. A method in accordance with claim 1 wherein said gypsum moldings are molded by employing a wet method comprising mixing said fibrous α-calcium sulfate hemihydrate suspension with reinforcing agents, preparing and dehydrating the resulting mixed suspension and curing and drying the resulting wet mat.

3. A method in accordance with claim 1 wherein said gypsum moldings are molded by employing a wet method comprising mixing fibrous α-calcium sulfate hemihydrate suspension with reinforcing agents, preparing and dehydrating the resulting mixed suspension, pressure molding the resulting wet mat at a pressure above 50 Kg/cm$^2$ and curing and drying the resulting moldings.

4. A method in accordance with claim 1 wherein said gypsum moldings are molded by employing a method comprising adding water to the fibrous α-calcium sulfate hemihydrate, mixing the resulting wet hemihydrate with reinforcing agents and pressure molding the resulting mixture.

5. A method in accordance with claim 1 wherein said gypsum moldings are molded by employing a dry method comprising mixing fibrous α-calcium sulfate hemihydrate with reinforcing agents, molding the resulting mixture, adding water to the resulting moldings and pressing the resulting wet moldings.

6. A method in accordance with claim 1 wherein said fibrous α-calcium sulfate hemihydrate has a fiber length in the range 30–450μ and a radius in the range 1–5μ.

* * * * *